United States Patent [19]
Opperthauser

[11] Patent Number: 6,105,216
[45] Date of Patent: Aug. 22, 2000

[54] CLAMP ASSEMBLY

[75] Inventor: Orval A. Opperthauser, Atlantis, Fla.

[73] Assignee: Hydra-Zorb Co., Auburn Hills, Mich.

[21] Appl. No.: 09/257,804

[22] Filed: Feb. 25, 1999

[51] Int. Cl.⁷ ............................ A44B 21/00; F16G 11/00; F16L 3/00
[52] U.S. Cl. ............................... 24/459; 24/279; 24/487; 248/74.1
[58] Field of Search ............................ 24/459, 487, 279, 24/278, 274; 248/74.1, 74.3, 74.4, 49

[56] References Cited

U.S. PATENT DOCUMENTS

| | | |
|---|---|---|
| 2,397,680 | 4/1946 | Morehouse . |
| 3,042,352 | 7/1962 | Stamper . |
| 3,856,246 | 12/1974 | Sinko ........................................ 248/49 |
| 4,061,299 | 12/1977 | Kurosaki . |
| 4,334,659 | 6/1982 | Yuda . |
| 4,356,987 | 11/1982 | Schmid . |
| 4,379,536 | 4/1983 | Mizuno et al. ........................... 24/459 |
| 4,478,381 | 10/1984 | Pittion et al. ............................ 24/487 |
| 4,516,296 | 5/1985 | Sherman . |
| 4,771,516 | 9/1988 | Foth ........................................ 24/459 |
| 4,934,635 | 6/1990 | Sherman . |
| 4,997,148 | 3/1991 | Sherman . |
| 5,014,940 | 5/1991 | Sherman . |
| 5,113,717 | 5/1992 | Plamper ................................. 248/74.1 |
| 5,149,027 | 9/1992 | Weber . |
| 5,150,865 | 9/1992 | Miller . |
| 5,215,281 | 6/1993 | Sherman . |
| 5,390,876 | 2/1995 | Hatano et al. . |
| 5,494,245 | 2/1996 | Suzuki et al. . |
| 5,593,115 | 1/1997 | Lewis . |
| 5,820,048 | 10/1998 | Shereyk et al. ........................ 248/74.1 |

FOREIGN PATENT DOCUMENTS

| | | | |
|---|---|---|---|
| 1559036 | 3/1969 | France ..................................... | 24/459 |
| 0221618 | 6/1962 | Germany ................................ | 24/459 |

Primary Examiner—Victor N. Sakran
Attorney, Agent, or Firm—Bliss McGlynn, P.C.

[57] ABSTRACT

The clamp assembly secures a tubular member to a support structure. A first embodiment of the clamp assembly includes a base for attachment to the support structure. A saddle, supported on the base, has an axial pocket extending laterally between a pair of spaced parallel sides for receiving the tubular member. A U-shaped clamp member having first and second legs straddles the saddle to clamp the tubular member in the pocket of the saddle. The assembly is characterized by a snap together connection for connecting the U-shaped clamp member and the saddle. A second embodiment of the clamp assembly includes a U-shaped clamp member having a first pair of spaced apart legs and a second pair of spaced apart legs forming an axial pocket therebetween for receiving a tubular member. A base is attached to the U-shaped clamp member with a living hinge for pivoting from an opened position to a closed position enclosing the pocket. The second embodiment clamp assembly is characterized by a snap together connection for connecting the U-shaped clamp member to a support structure thereby enclosing the tubular member in the pocket with the base maintained between the tubular member and the support structure. A third embodiment of the clamp assembly includes a first C-shaped clamp member and a second C-shaped clamp member opposing the first clamp member. A living hinge is connected between the first and second clamp members for pivoting the clamp members from an opened position to a closed position thereby forming a pocket to receive a tubular member. The third embodiment clamp assembly is characterized by a snap together connection for connecting the clamp.

13 Claims, 8 Drawing Sheets

CLAMP ASSEMBLY

BACKGROUND OF THE INVENTION

1. Field of the Invention

The present invention relates to a clamp assembly for supporting a tubular member.

2. Description of the Prior Art

Most fluid-carrying tubes vibrate and create noise in response to fluid surges. To reduce noise and vibration, these tubes are attached to a support structure. Often such tubes are secured to the support structure in a side-by-side or parallel arrangement with C-shaped snap clamps or U-bolt clamp assemblies.

Prior art C-shaped snap clamps are typically made from plastic and include a snap-fit connection and a living hinge. The snap-fit connection is located adjacent to the mouth of the C-shaped clamp. Although C-shaped snap clamps eliminate noise and vibration, they have several shortcomings. For example, the location of the snap-fit connection increases the width of the clamp and thereby reduces the number of tubes which may be secured in a side-by-side arrangement to the support structure. Further, overtime the plastic will experience free flow expansion. This expansion may cause the snap-fit connection to open and thereby release the tube.

Prior art U-bolt clamp assemblies provide a more reliable attachment, however, they also have several shortcomings. U-bolt clamp assemblies typically require two nuts to secure each end of the U-bolt to the support structure. Using two nuts to secure the assembly to the support structure greatly increases both the installation time and cost of the assembly. Accordingly, there is a need for a clamp assembly which overcomes the shortcomings of the prior art.

SUMMARY OF THE INVENTION AND ADVANTAGES

The present invention is a clamp assembly for supporting a tubular member. A first embodiment of the clamp assembly includes a base for attachment to a support structure. A saddle, supported on the base, has an axial pocket extending laterally between a pair of spaced parallel sides for receiving the tubular member. The clamp assembly further includes a U-shaped clamp member having first and second legs for straddling the saddle to clamp the tubular member in the pocket of the saddle. The first embodiment clamp assembly is characterized by a snap together connection for connecting the U-shaped clamp member and the saddle.

The first leg of the U-shaped clamp member includes a first foot being defined by a first beveled hook and the second leg of the U-shaped clamp member includes a second foot being defined by a second beveled hook. The U-shaped clamp member is snapped to the saddle by hooking the first beveled hook to the bottom edge of one side of the saddle and hooking the second beveled hook to the bottom edge of the other side of the saddle.

A second embodiment of the clamp assembly includes a U-shaped clamp member having a first pair of spaced apart legs and a second pair of spaced apart legs forming an axial pocket therebetween for receiving a tubular member. A base is attached to the U-shaped clamp member with a living hinge for pivoting from an opened position to a closed position enclosing the pocket. The second embodiment clamp assembly is characterized by a snap together connection for connecting the U-shaped clamp member to a support structure thereby enclosing the tubular member in the pocket with the base maintained between the tubular member and the support structure.

Each leg of the U-shaped clamp member includes a foot for catching a pair of retaining lips presented by the support structure. The support structure further includes an abutment surface disposed between the pair of retaining lips for maintaining the base in the closed position after the feet of the U-shaped clamp member legs are hooked on the retaining lips of the support structure.

A third embodiment of the clamp assembly includes a first C-shaped clamp member and a second C-shaped clamp member opposing the first clamp member. A living hinge is connected between the first and second clamp members for pivoting the clamp members from an opened position to a closed position thereby forming a pocket to receive a tubular member. The third embodiment clamp assembly is characterized by a snap together connection for connecting the clamp assembly to a support structure and maintaining the first and second clamp members in the closed position.

Both the first and second clamp members include a downwardly extending hook for catching one of a pair of retaining slots formed in the support structure and preventing the respective clamp member from spreading back to the opened position.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
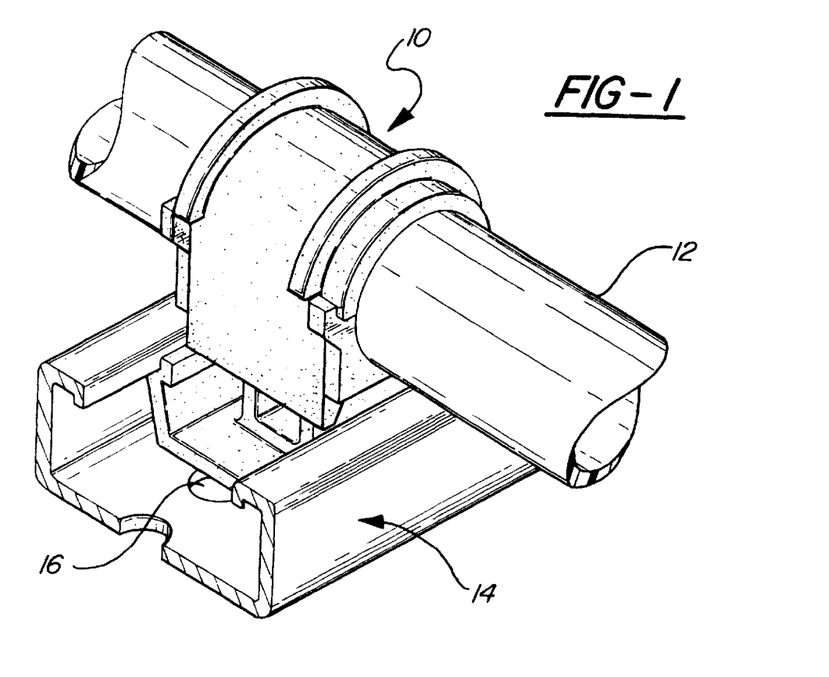
FIG. 1 is a fragmentary perspective view of a first embodiment of a clamp assembly in accordance with the present invention securing a tubular member to a support structure.
Figure 2:
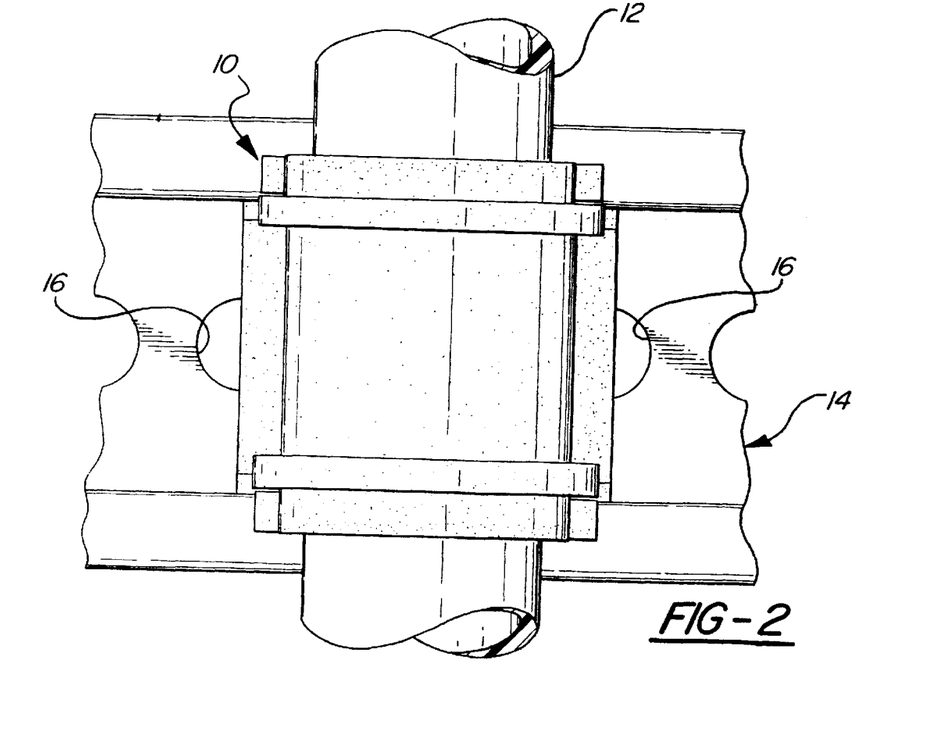
FIG. 2 is a fragmentary top view of the first embodiment clamp assembly securing the tubular member to the support structure.

Referring to the Figures, wherein like numerals indicate like or corresponding parts throughout the several views, a first embodiment of a clamp assembly 10 securing a tubular member 12 to a support structure 14 in accordance with the present invention is shown in FIGS. 1 and 2. It will become apparent to one skilled in the art that the inventive clamp assembly 10 may be used to secure several types of tubular members, such as hydraulic pipes, pneumatic tubes, refrigeration lines, etc., to the support structure 14. The support structure 14, shown as an anchor channel in FIGS. 1–8, includes a plurality of pilot holes 16.

Figure 3:
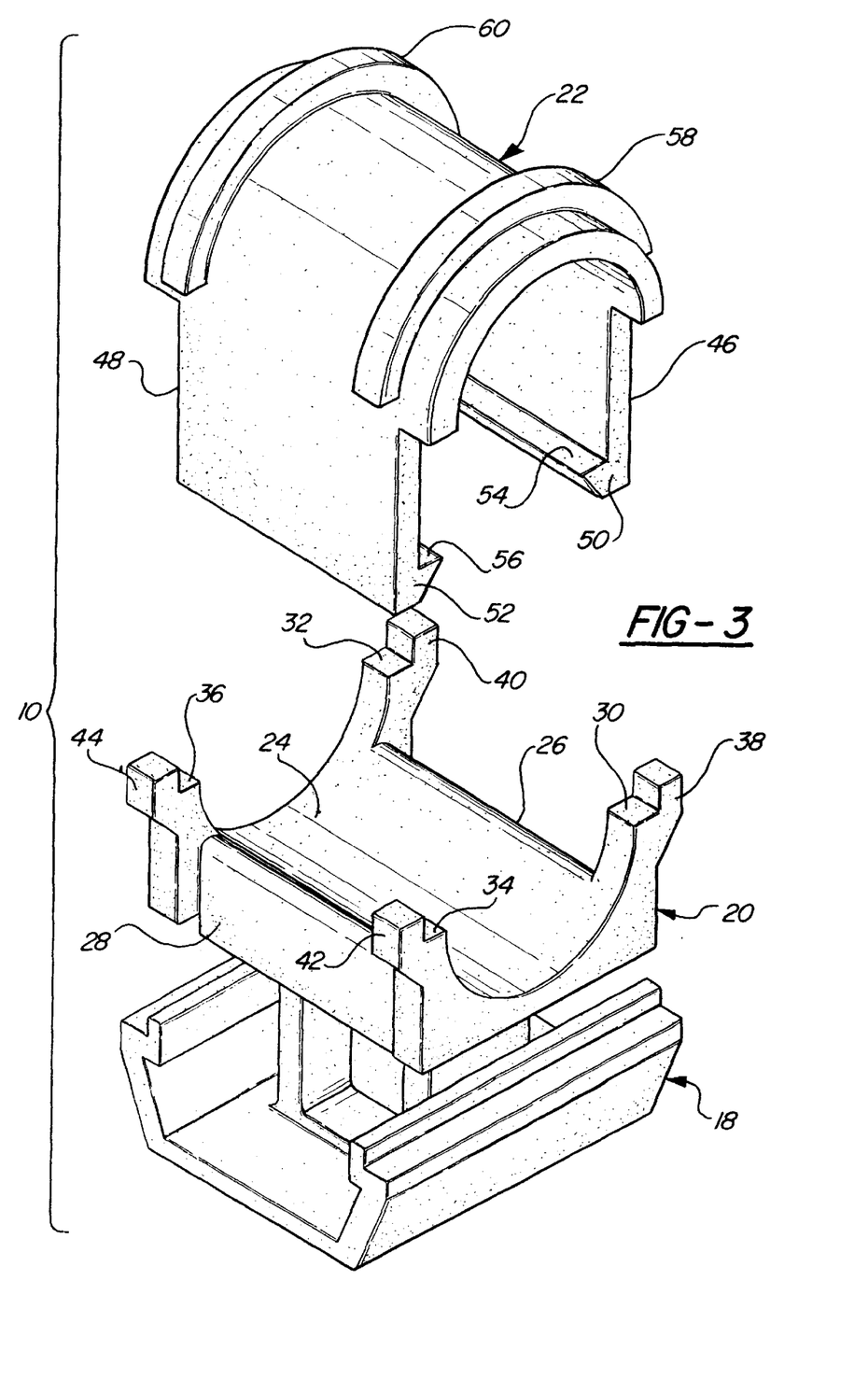
FIG. 3 is an exploded perspective top view of the first embodiment clamp assembly.

FIG. 3 is an exploded perspective top view of the first embodiment clamp assembly 10. The clamp assembly 10 includes a base 18, a saddle 20, and a U-shaped clamp member 22. The base 18 is designed to attach to the support structure 14.

The saddle 20 is supported on the base 18 and includes an axial pocket 24 extending laterally between a pair of spaced parallel sides 26 and 28. The axial pocket 24 forms a first half of a semi-cylindrical portion to receive the tubular member 12. A plurality of shoulders 30, 32, 34, and 36 extend laterally from the saddle 20. A plurality of arms 38, 40, 42, and 44 extend upwardly from the lateral extremity of the shoulders 30, 32, 34, and 36 respectively.

The U-shaped clamp member 22 forms a second half of a semi-cylindrical portion for mating engagement with the saddle 20 to enclose the tubular member 12 therebetween. The U-shaped clamp member 22 includes a first leg 46 and a second leg 48 for straddling the saddle 20 and thereby clamping the tubular member 12 in the pocket 24 of the saddle 20. The first leg 46 and the second leg 48 includes a first foot 50 and a second foot 52 defined by a first beveled hook 54 and a second beveled hook 56 respectively. A pair of reinforcing ribs 58 and 60 extend in a semi-circle between the first leg 46 and second leg 48.

Figure 4:
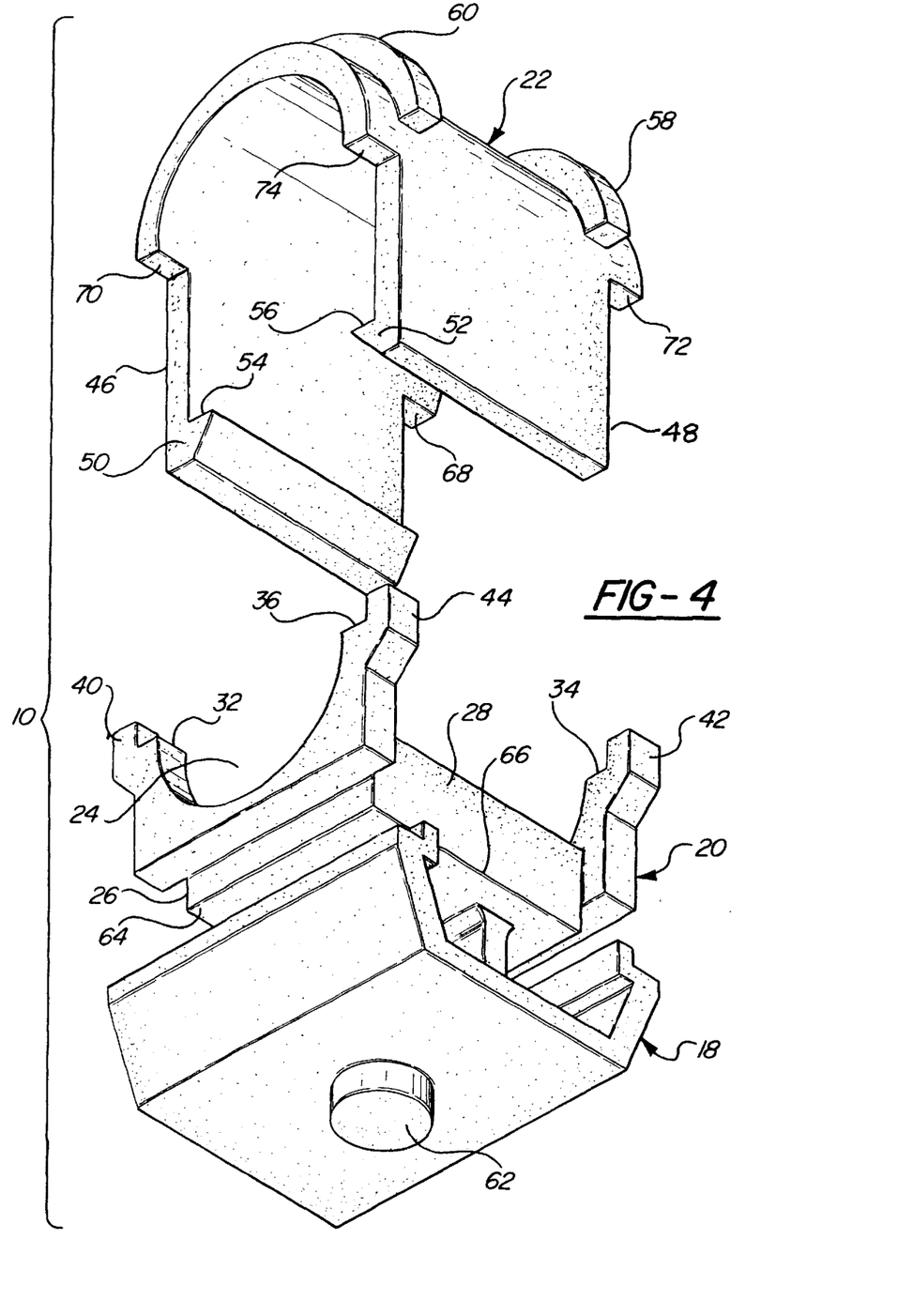
FIG. 4 is an exploded perspective bottom view of the first embodiment clamp assembly.

FIG. 4 is an exploded perspective bottom view of the first embodiment clamp assembly 10. As best shown in this view, the base 18 further includes a pilot 62 extending downward from the bottom surface of the base 18. The first and second sides 26 and 28 of the saddle 20 further include bottom edges 64 and 66 respectively. The U-shaped clamp member 22 extends axially outward of the reinforcing ribs 58 and 60 and the legs 46 and 48 to define abutments 68, 70, 72, and 74.

Figure 5:
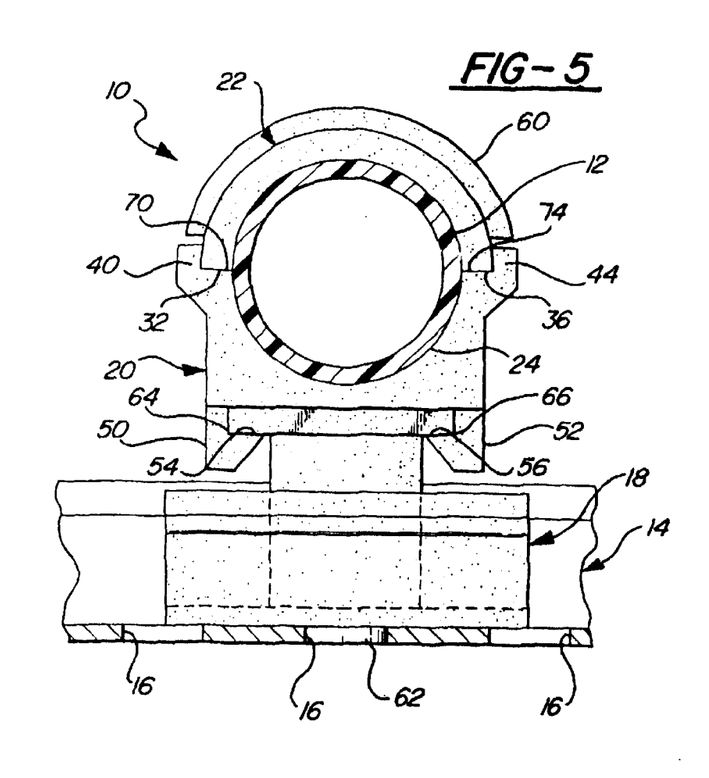
FIG. 5 is a fragmentary front view of the first embodiment clamp assembly securing the tubular member to the support structure.

FIG. 5 is a fragmentary front view of the first embodiment clamp assembly 10 securing the tubular member 12 to the support structure 14. The clamp assembly 10 is characterized by a snap together connection for connecting the U-shaped clamp member 22 and the saddle 20. To connect the U-shaped clamp member 22 and the saddle 20, the first and second legs 46 and 48 must straddle the first and second sides 26 and 28 of the saddle 20. To snap close the connection, the first beveled hook 54 is hooked over the bottom edge 64 of the first side 26 of the saddle 20 and the second beveled hook 56 is hooked over the bottom edge 66 of the second side 28 of the saddle 20.

In the connected position, the beveled hooks 54 and 56 prevent the U-shaped clamp 22 from moving upwardly away from the saddle 20. At the same time, the shoulders 30, 32, 34, and 36 meet the abutments 68, 70, 72, and 74 respectively limiting any further downward movement of the U-shaped clamp 22 onto the saddle 20. In the connected position, the arms 38, 40, 42, and 44 overlie the abutments 68, 70, 72, and 74 respectively and thereby hold the abutments 68, 70, 72, and 74 on the shoulders 30, 32, 34, and 36 respectively.

Figure 6:
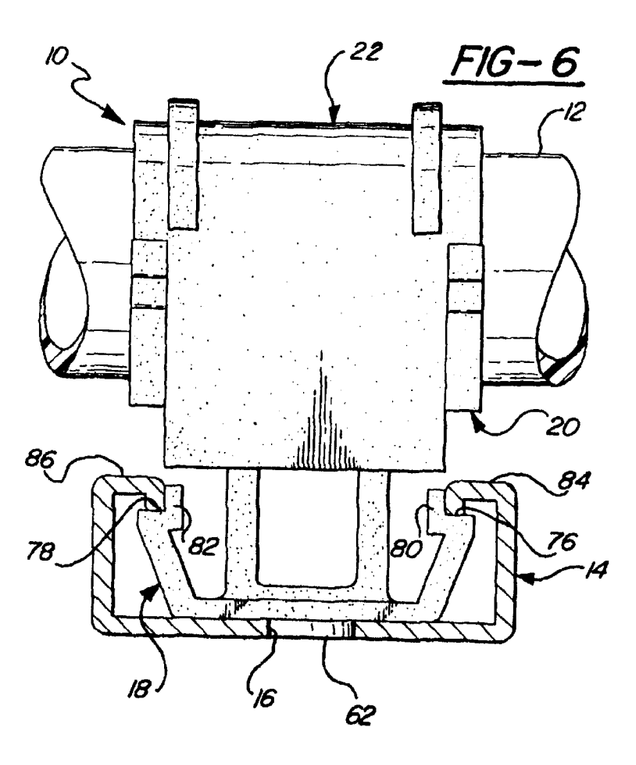
FIG. 6 is a fragmentary side view of the first embodiment clamp assembly securing the tubular member to the support structure.

FIG. 6 is a fragmentary side view of the first embodiment clamp assembly 10 securing the tubular member 12 to the support structure 14. As best shown in this view, the base 18 includes a pair of ledges 76 and 78. A pair of fingers 80 and 82 extend upwardly from the ledges 76 and 78 respectively. When the base 18 is snapped into the support structure 14, the ledges 76 and 78 and the fingers 80 and 82 abut a pair of retaining lips 84 and 86 presented by the support structure 14 and thereby preventing the clamp assembly 10 from unsnapping from the support structure 14. As further shown in FIG. 6, the pilot 62 is inserted into one of the plurality of pilot holes 16 in the support structure 14 to prevent lateral movement of the clamp assembly 10 within the support structure 14.

Figure 7:
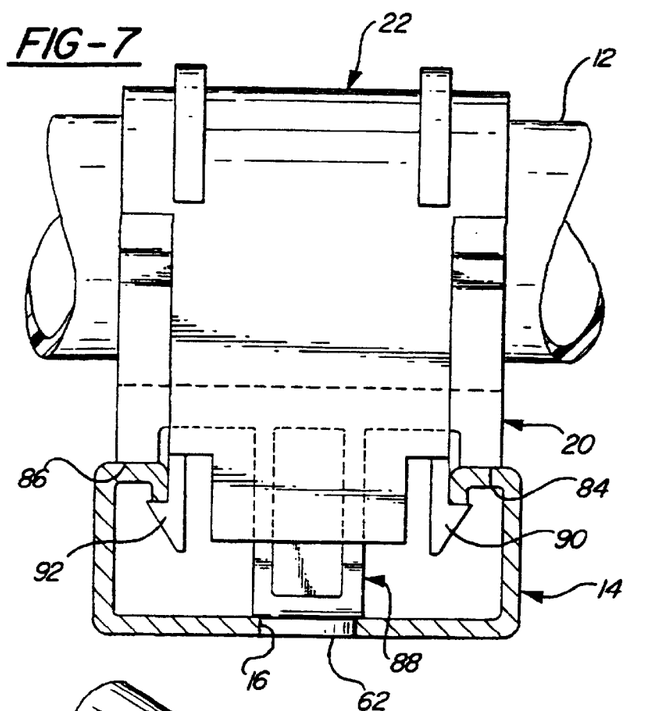
FIG. 7 is a fragmentary side view of the first embodiment clamp assembly having an alternative base attached to the support structure.

FIG. 7 is a fragmentary side view of the first embodiment clamp assembly 10 having an alternative base 88 attached to the support structure 14. Base 88 includes a pair of catches 90 and 92 downwardly extending from the bottom of the saddle 20 for catching the pair of retaining lips 84 and 86 presented by the support structure 14 and thereby preventing the clamp assembly 10 from unsnapping from the support structure 14.

Figure 8:
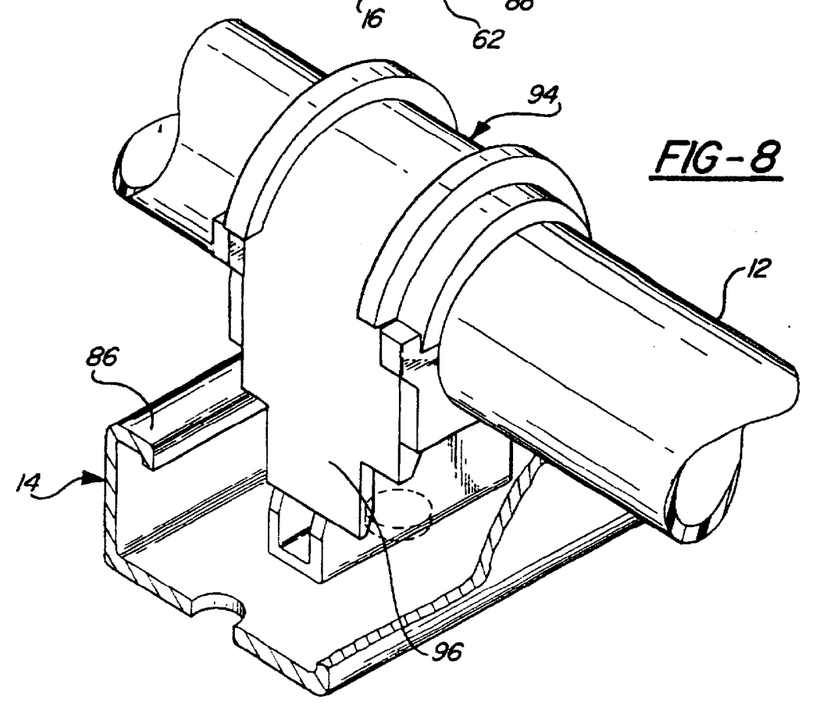
FIG. 8 is a fragmentary perspective view of the first embodiment clamp assembly having an alternative U-shaped clamp member securing the tubular member to the support structure.

FIG. 8 is a fragmentary perspective view of the first embodiment clamp assembly 10 having an alternative U-shaped clamp member 94 securing the tubular member 12 to the support structure 14. In FIG. 8, a portion of the support structure 14 is broken away to reveal that a first leg 96 and a second leg (not shown) of the U-shaped clamp member 94 extend downward between the retaining lips 84 (broken away) and 86 of the support structure 14 to prohibit transverse movement of the base 18 or 88 within the support structure 14.

Figure 9:
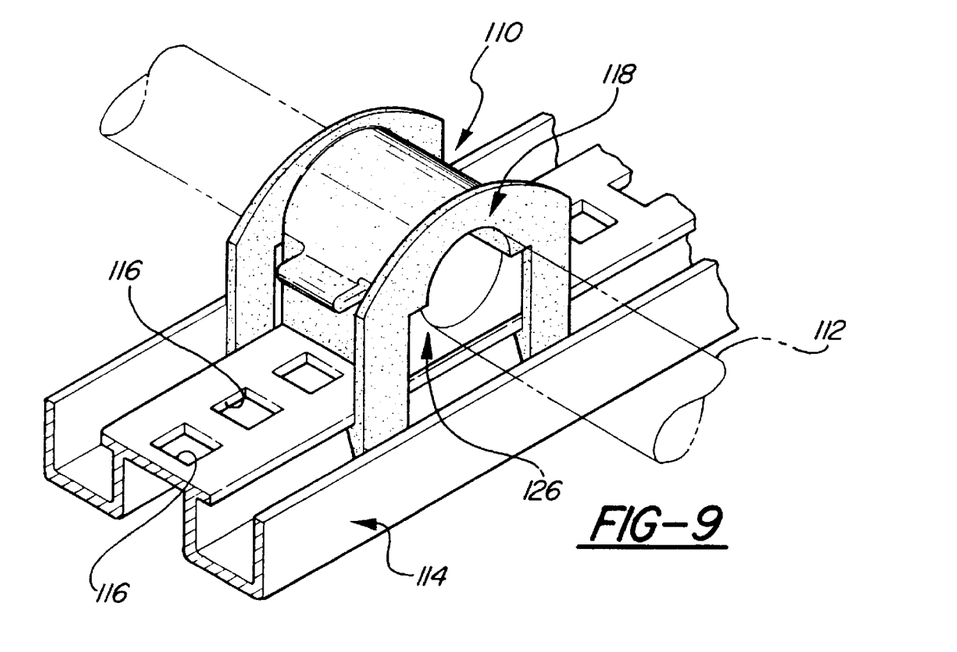
FIG. 9 is a fragmentary perspective view of a second embodiment of a clamp assembly in accordance with the present invention securing a tubular member to a support structure.

FIG. 9 is a fragmentary perspective view of a second embodiment of a clamp assembly 110 in accordance with the present invention securing a tubular member 112, shown in phantom lines, to a support structure 114. It will become apparent to one skilled in the art that the inventive clamp assembly 110 may be used to secure several types of tubular members, such as hydraulic pipes, pneumatic tubes, refrigeration lines, etc., to the support structure 114. The support structure 114, as shown in FIG. 9, includes a plurality of pilot holes 116.

Figure 10:
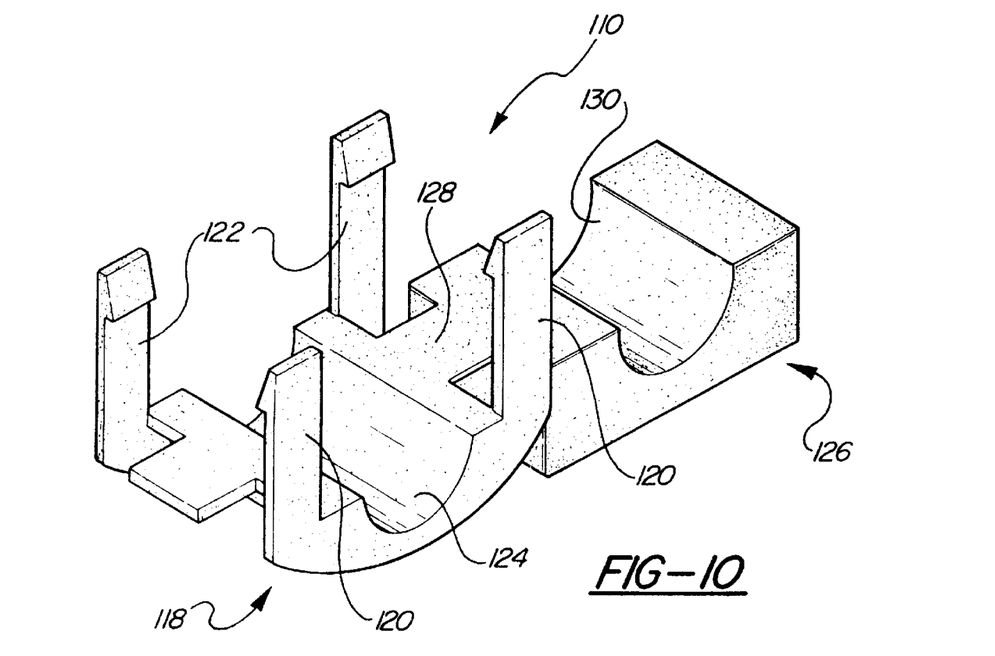
FIG. 10 is a perspective bottom view of the second embodiment clamp assembly shown in an opened position.

FIG. 10 is a perspective bottom view of the second embodiment clamp assembly 110 shown in an opened position. The second embodiment clamp assembly 110 includes a U-shaped clamp member 118 having a first pair of spaced apart legs 120 and a second pair of spaced apart legs 122 forming an axial pocket 124 therebetween for receiving the tubular member 112. A base 126 is attached to the U-shaped clamp member 118 with a living hinge 128 for pivoting from the opened position, shown in FIGS. 10 and 11, to a closed position, shown in FIGS. 9 and 12, enclosing the axial pocket 124. Thus, the base 126 preferably includes an arcuate surface 130 to complement and complete the cylinder-shaped pocket 124 when the base 126 is held in the closed position.

Figure 11:
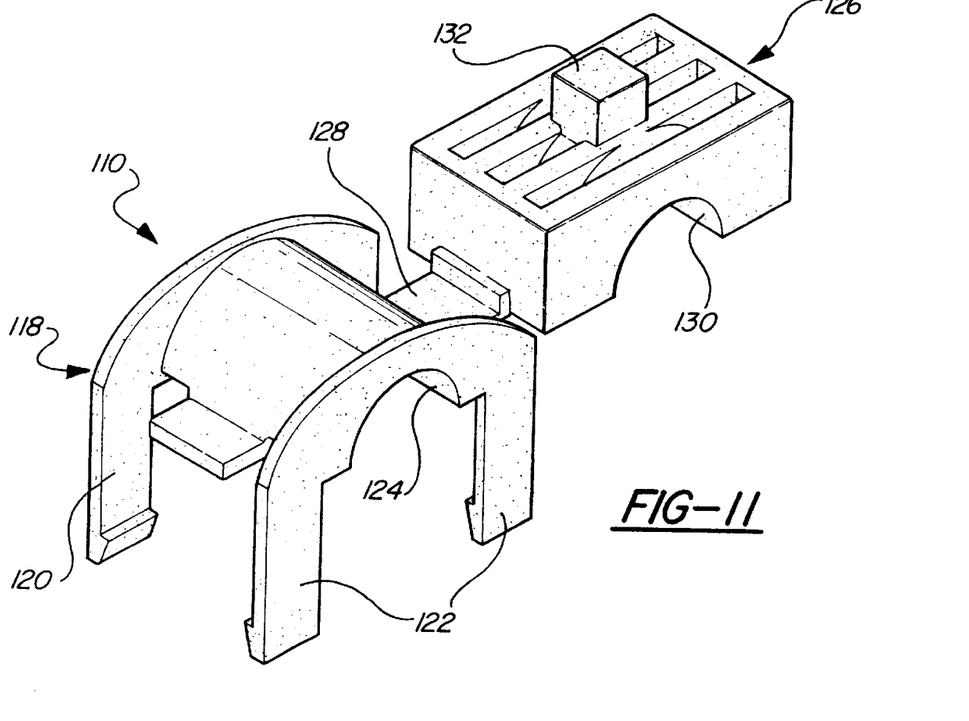
FIG. 11 is a perspective top view of the second embodiment clamp assembly shown in the opened position.

FIG. 11 is a perspective top view of the second embodiment clamp assembly 110 shown in the opened position. As best seen in FIG. 11, a pilot 132 extends from the base 126. The pilot 132 is adapted for insertion into one of the plurality of pilot holes 116 when the assembly 110 is connected to the support structure 114.

Figure 12:
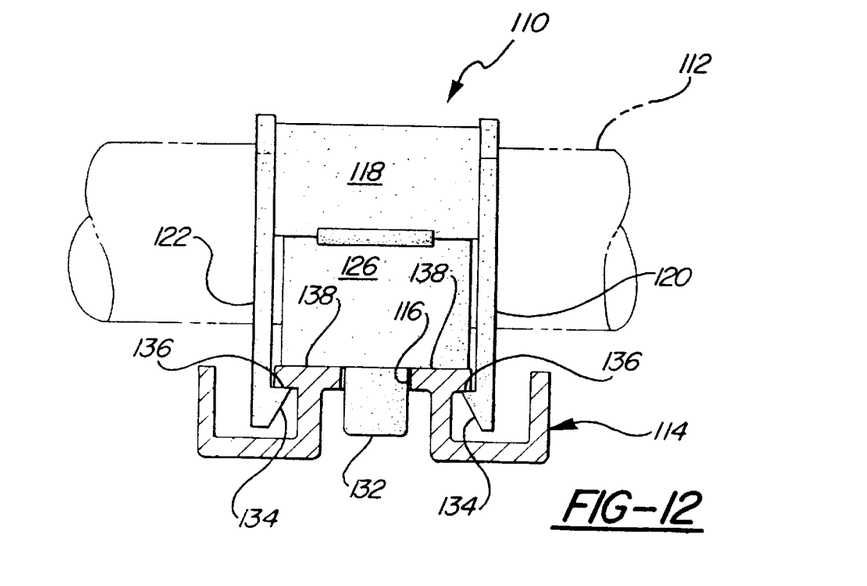
FIG. 12 is a fragmentary side view of the second embodiment clamp assembly shown in a closed position securing the tubular member to the support structure.

FIG. 12 is a fragmentary side view of the second embodiment clamp assembly 110 securing the tubular member 112, shown in phantom lines, to the support structure 114. The second embodiment clamp assembly 110 is characterized by a snap together connection for connecting the U-shaped clamp member 118 to the support structure 114 thereby enclosing the tubular member 112 in the axial pocket 124 with the base 126 maintained between the tubular member 112 and the support structure 114. To accomplish the clamp assembly/support structure connection, each leg 120 and 122 preferably includes a foot 134 for catching a pair of retaining lips 136 presented by the support structure 114. To maintain the base 126 in the closed position after the feet 134 are hooked on the retaining lips 136, the support structure 114 includes an abutment surface 138 disposed between the pair of retaining lips 136. To prevent lateral movement of the second embodiment clamp assembly 110 along the support structure 114, the pilot 132 extending downward from the base 126 of the assembly 110 is inserted into one of the plurality of pilot holes 116 in the abutment surface 138 of the support structure 114 as shown in FIG. 12.

Figure 13:
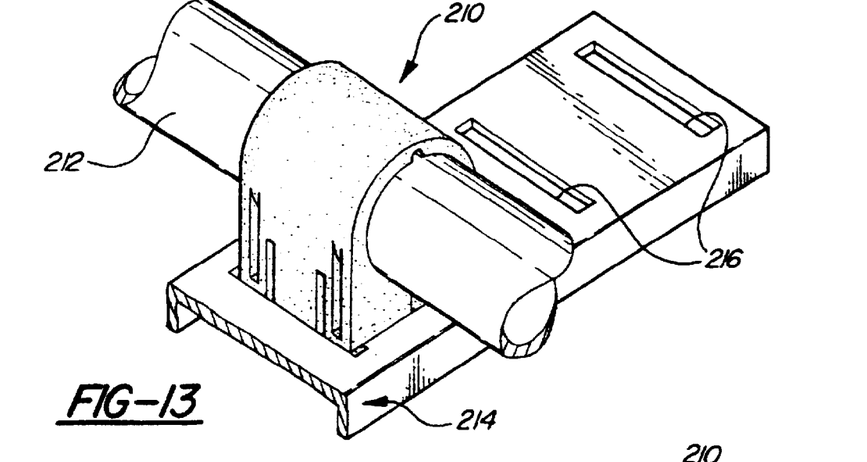
FIG. 13 is a fragmentary perspective view of a third embodiment of a clamp assembly in accordance with the present invention securing a tubular member to a support structure.

FIG. 13 is a fragmentary perspective view of a third embodiment of a clamp assembly 210 in accordance with the present invention securing a tubular member 212 to a support structure 214. It will become apparent to one skilled in the art that the inventive clamp assembly 210 may be used to secure several types of tubular members, such as hydraulic pipes, pneumatic tubes, refrigeration lines, etc., to the support structure 214. The support structure 214, as shown in FIG. 13, includes a plurality of retaining slots 216.

Figure 14:
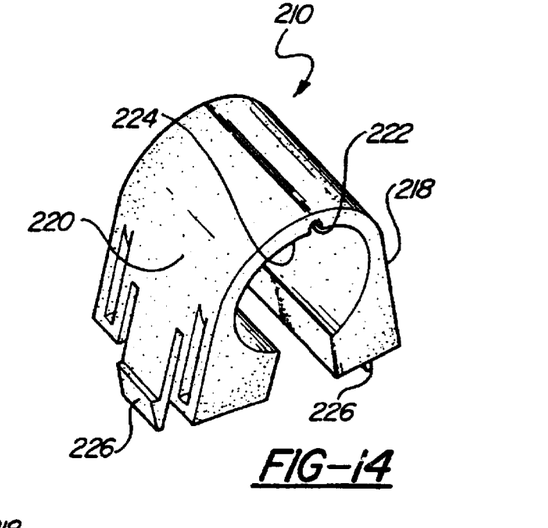
FIG. 14 is a perspective view of the third embodiment clamp assembly shown in the opened position.
Figure 15:
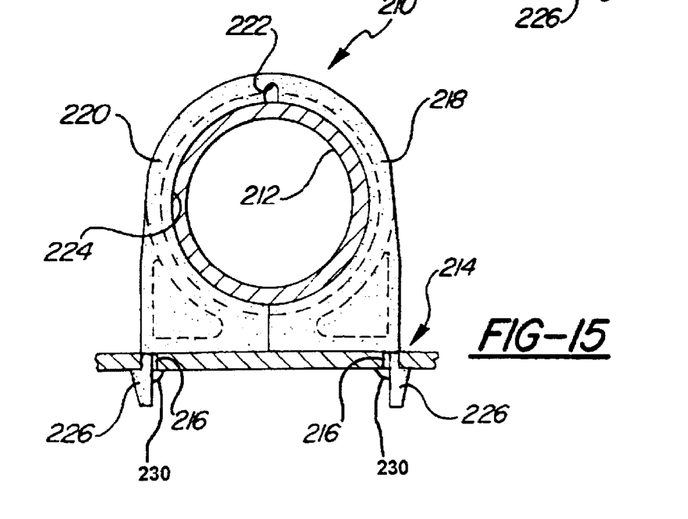
FIG. 15 is a fragmentary front view of the third embodiment clamp assembly shown in a closed position securing the tubular member to the support structure.

FIG. 14 is a perspective view of the third embodiment clamp assembly 210 shown in an opened position. The third embodiment clamp assembly 210 includes a first C-shaped clamp members 218 and 220 in the closed position. To accomplish the clamp assembly/support structure connection, each clamp member 218 and 220 includes a downwardly extending hook 226 for catching one of the retaining slots 216 formed in the support structure 214 and preventing the clamp member 218 or 220 from spreading back to the opened position. Additionally, a silicone type sealant, as commonly known in the art, may be applied at 230 between the inside of the hook 226 and the support structure 214 to fill the gap in the slot 216 and further prevent release of the clamp members 218,220 from the structure 214.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A clamp assembly for supporting a tubular member along a support structure, said clamp assembly comprising:

a base adapted to be removably attached to the support structure;

a saddle portion extending from said base and having a generally C-shaped support surface extending between a pair of spaced apart parallel sides and defining a first pocket extending axially between opposing first and second ends and laterally between said parallel sides for receiving and supporting the tubular member;

a generally U-shaped clamp member having a generally C-shaped tube portion extending between a pair of spaced apart parallel legs and defining a second pocket extending axially between opposing first and second ends and laterally between said parallel legs for aligning axially with and closing said first pocket; and a flexible, spring bias snap together connection for selectively interconnecting said U-shaped clamp member and said saddle portion, said snap together connection defined by each of said legs having an inwardly projecting foot for engaging said respective parallel side and releasably locking said legs around said saddle portion.

2. A clamp assembly as set forth in claim 1 wherein said parallel sides of said saddle portion extend from said C-shaped support surface to respective bottom edges positioned between said pair of parallel legs for engaging with said respective projecting foot to clamp said clamp member to said saddle portion.

3. A clamp assembly as set forth in claim 2 wherein said saddle portion includes a plurality of shoulders extending laterally from said parallel sides for engaging and limiting movement of said clamp member onto said saddle portion.

4. A clamp assembly as set forth in claim 3 wherein said clamp portion includes a plurality of abutments extending axially from said C-shaped tube portion for engaging said respective plurality of shoulders on said saddle portion to limit movement of said clamp member onto said saddle portion.

5. A clamp assembly as set forth in claim 4 wherein said saddle portion includes a plurality of arms projecting from said shoulders for engaging and restraining said tube portion of said clamp member therebetween.

6. A clamp assembly as set forth in claim 5 wherein said clamp member includes a pair of raised, semi-circular, reinforcing ribs extending laterally between said opposing pair of legs on said tube portion.

7. A clamp assembly as set forth in claim 6 wherein said clamp member extends axially outward from said reinforcing ribs and said legs to define said abutments at each axial end thereof.

8. A clamp assembly as set forth in claim 7 wherein said base includes a pair of ledges extending laterally outwardly from said base and a pair of fingers extending upwardly from said ledges for abutting a pair of retaining lips presented by the support structure.

9. A clamp assembly as set forth in claim 7 wherein said base includes a pair of downwardly extending catches for engaging and catching a pair of retaining lips presented by the support structure.

10. A clamp assembly as set forth in claim 7 including a support structure for supporting said base including an elongated channel having a pair of retaining lips extending laterally inwardly from said channel wherein said legs of said clamp member extend downwardly into said channel and between said retaining lips.

11. A clamp assembly as set forth in claim 1 wherein said support structure includes a plurality of pilot holes extending through said channel and said base includes a downwardly extending pilot for insertion into one of said pilot holes to align said base longitudinally along said channel.

12. A clamp assembly for supporting a tubular member along a support structure, said clamp assembly comprising:

a base portion having a generally C-shaped channel extending axially between a first end and a second end;

a generally U-shaped clamp member having a generally C-shaped pocket extending axially between a first end and a second end, a first pair of spaced apart legs and a second pair of spaced apart legs projecting outwardly from said respective first and second ends and along opposing sides of said pocket;

a living hinge member interconnecting said base portion and said clamp member for pivoting said clamp member between an open position for receiving the tubular member and a closed position for closing said pocket about the tubular member; and a flexible, spring bias snap together connection for selectively connecting said clamp assembly to the support structure, said snap together connection defined by said legs including a foot for engaging the support structure to releasably connect said clamp assembly to the support structure and retain the tubular member between said clamp member and said base portion.

13. A clamp assembly for supporting a tubular member along a support structure, said clamp assembly comprising:

a first clamp member having a C-shaped pocket extending axially between a first end and a second end for surrounding a portion of the tubular member;

a second clamp member having a C-shaped pocket extending axially between a first end and a second end for surrounding the remaining portion of the tubular member;

a living hinge member interconnecting said first clamp member and said second clamp member for pivoting movement between an open position for receiving the tubular member therebetween and a closed position for closing said pockets around the tubular member; and a flexible, spring bias snap together connection for selectively connecting each of said first and second clamp members to the support structure, said snap together connection defined by each clamp member including a downwardly extending hook for releasably connecting each of said clamp members to the support structure with said clamp assembly in said closed position surrounding and securing the tubular member to the support structure.

* * * * *